(12) United States Patent
Calle et al.

(10) Patent No.: US 7,079,539 B2
(45) Date of Patent: Jul. 18, 2006

(54) METHOD AND APPARATUS FOR CLASSIFICATION OF PACKET DATA PRIOR TO STORAGE IN PROCESSOR BUFFER MEMORY

(75) Inventors: Mauricio Calle, Austin, TX (US); Joel R. Davidson, Austin, TX (US); Betty A. McDaniel, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 868 days.

(21) Appl. No.: 10/029,705

(22) Filed: Dec. 21, 2001

(65) Prior Publication Data

US 2003/0118020 A1     Jun. 26, 2003

(51) Int. Cl.
*H04L 12/28* (2006.01)
*H04L 12/50* (2006.01)
*H04Q 11/00* (2006.01)

(52) U.S. Cl. ........................ 370/392; 370/428
(58) Field of Classification Search .................. None
See application file for complete search history.

(56) References Cited

U.S. PATENT DOCUMENTS 4,953,107 A * 8/1990 Hedley et al. .............. 345/422
5,553,067 A * 9/1996 Walker et al. .............. 370/390
6,041,048 A * 3/2000 Erickson et al. ............ 370/349
6,724,767 B1 * 4/2004 Chong et al. ............... 370/412

* cited by examiner

*Primary Examiner*—Chau Nguyen
*Assistant Examiner*—Cynthia L. Davis

(57) ABSTRACT

A network processor or other type of processor includes in an illustrative embodiment a first pass classifier coupled to first memory circuitry in the form of a relatively small internal memory, and a second pass classifier coupled to second memory circuitry in the form of a larger internal buffer memory. The first memory circuitry is configurable to store at least a portion of a given packet to be processed by the first pass classifier. The second memory circuitry is configurable to store a different and preferably smaller portion of the given packet to permit processing thereof by the second pass classifier. The portion of the given packet storable in the second memory circuitry is a portion of the given packet determined by a first pass classification, performed by the first pass classifier, to be required for a second pass classification, performed by the second pass classifier. Advantageously, the invention reduces the size of the packet portion required to be stored in the second memory circuitry, thereby reducing the required memory of the processor. The processor may be configured as a network processor integrated circuit to provide an interface between a network from which the packet is received and a switch fabric in a router or switch.

17 Claims, 3 Drawing Sheets

METHOD AND APPARATUS FOR CLASSIFICATION OF PACKET DATA PRIOR TO STORAGE IN PROCESSOR BUFFER MEMORY

FIELD OF THE INVENTION

The present invention relates generally to packet processing systems, and more particularly to a network processor or other type of processor configured for use in performing packet routing, packet switching and other packet processing operations within such a system.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

In performing packet processing operations such as routing or switching, the network processor typically must examine at least a portion of the beginning or header of each packet. The amount of each packet that must be examined is dependent upon its associated network communication protocols, enabled options, and other similar factors. The sophistication or complexity of the router or switch can also influence the amount of each packet that will need examination.

Many conventional routers and switches are configured to store, for a given packet being processed, substantially the entire packet, until that packet is finally transmitted to its destination or dropped. The packet is usually stored in a router or switch memory external to its network processor. The amount of time the given packet may be kept in external memory is influenced by the basic processing time of the router or switch, the quality of service applied to the packet, the particular protocol layers to be analyzed, and the congestion of the port or other communication channel to which the packet is directed.

High-speed routers and switches will typically store in on-chip memory within the network processor some portion of a given packet being processed by that network processor. This greatly enhances the performance of the router or switch by not requiring it to access the larger external memory holding the entire packet, in that the external memory is slower and more band-limited than the on-chip memory. However, in conventional practice, the worst-case packet portion that may need to be analyzed in a given router or switch application usually dictates the size of every packet portion kept in on-chip memory, even though the worst-case packet portion may be associated with only certain rarely-occurring packets. This significantly increases the required size of the on-chip memory, and thus the cost and complexity of the network processor.

It is therefore apparent that a need exists for improved techniques for determining particular portions of packets to be stored in particular memories associated with a network processor or other type of processor, so as to reduce the memory requirements of the device.

SUMMARY OF THE INVENTION

The invention provides a significant reduction in the memory requirements of a network processor or other type of processor.

In accordance with one aspect of the invention, a network processor or other type of processor includes in an illustrative embodiment a first pass classifier coupled to first memory circuitry, the first memory circuitry being, e.g., in the form of a relatively small internal memory, and a second pass classifier coupled to second memory circuitry, the second memory circuitry being, e.g., in the form of a larger internal buffer memory. The first memory circuitry is configurable to store at least a portion of a given packet to be processed by the first pass classifier. The second memory circuitry is configurable to store a different and preferably smaller portion of the given packet to permit processing thereof by the second pass classifier. The portion of the given packet storable in the second memory circuitry is a portion of the given packet determined by a first pass classification, performed by the first pass classifier, to be required for a second pass classification, performed by the second pass classifier. Advantageously, the invention reduces the size of the packet portion required to be stored in the second memory circuitry, thereby reducing the required memory of the processor.

The processor may be configured as a network processor integrated circuit to provide an interface between a network from which the packet is received and a switch fabric in a router or switch.

In accordance with a further aspect of the invention, at least the first pass classification may be dynamically updatable, e.g., under control of a host processor or other device operatively coupled to the network processor. This allows a programmer to specify the particular portions of a given category of packets to be stored in the internal buffer memory of the network processor.

Advantageously, the techniques of the invention not only reduce the processor memory requirements, but also speed up the classification process itself, thereby increasing processor throughput.

DETAILED DESCRIPTION OF THE INVENTION

Figure 1:
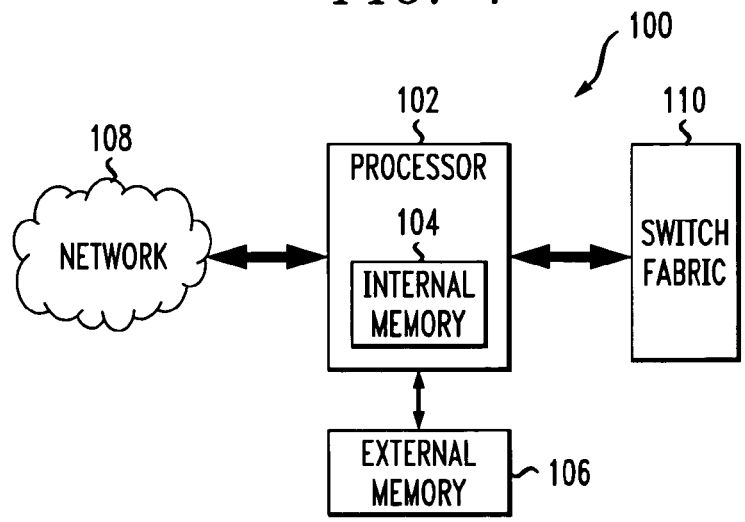
FIG. 1 is a simplified block diagram of a packet processing system in which the present invention is implemented.

The invention will be illustrated herein in conjunction with an exemplary packet processing system which includes a network processor configured in a particular manner. It should be understood, however, that the invention is more generally applicable to any processor in which it is desirable to reduce the memory requirements associated with packet processing operations performed in the processor.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions and combinations of these and other devices.

The term "classification circuitry" as used herein is intended to include any portion of a processor or other type of processing circuitry which is capable of performing at least a portion of at least one classification operation on a packet or a portion of a packet. Examples of classification operations include, without limitation, preclassification, reassembly, prioritization, statistics gathering, scheduling, traffic management, etc. As a more particular example, an illustrative embodiment of the invention to be described below includes first classification circuitry configured to perform a first pass classification and second classification circuitry configured to perform a second pass classification. The first pass classification in this embodiment generally includes at least a portion of a packet reassembly operation, and the second pass classification in this embodiment generally includes at least a portion of a scheduling or traffic management operation. The first and second classification circuitry may each represent, e.g., one or more separate classification engines, different portions of a single classification engine, or other arrangements of circuitry configured to provide at least a portion of the processing operations described herein. As another example, to be described in conjunction with FIG. 5 below, the first pass classification can be configured to prioritize packets in accordance with a desired prioritization for scheduling of second pass classification.

The present invention in the illustrative embodiment reduces the amount of memory required in a network processor or other type of processor by storing a given packet in a relatively small internal memory of the process prior to performing the first pass classification on the packet, and then storing in a larger internal buffer memory only the particular portions of the packet identified by the first pass classification as being required for the second pass classification. The second pass classification can thus be performed using the portion of the packet stored in the internal buffer memory, without having to store the entire packet in that memory. This significantly reduces the amount of memory required in the processor, and can also allow for higher packet throughput in the network processor by reducing the amount of time required to perform memory accesses associated with second pass classification.

FIG. 1 shows a packet processing system 100 in which the invention is implemented. The system 100 includes a network processor 102 having an internal memory 104. The network processor 102 is coupled to an external memory 106 as shown, and is configured to provide an interface between a network 108 from which cells, packets or other packet data are received and a switch fabric 110 which controls switching of packet data. The processor 102 and its associated external memory 106 may be implemented, e.g., as one or more integrated circuits installed on a line card or port card of a router or switch. In such a configuration, the switch fabric 110 is generally considered to be a part of the router or switch.

It should be understood that the particular arrangement of system elements shown in FIG. 1 is by way of illustrative example only. More particularly, as previously noted, the invention can be implemented in any type of packet processor, and is not limited to any particular packet processing application.

Figure 2:
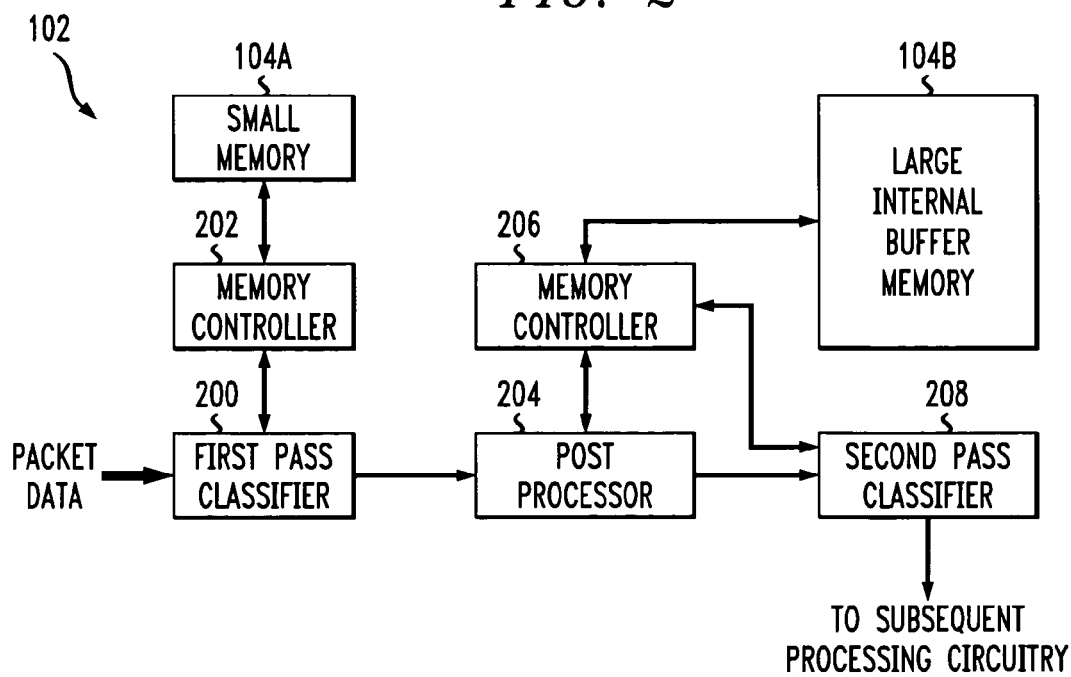
FIG. 2 is a more detailed view of a network processor of the FIG. 1 system configured in accordance with the techniques of the invention.

FIG. 2 shows the network processor 102 of FIG. 1 in greater detail. The network processor 102 in this embodiment includes a first pass classifier 200 which receives incoming packet data from the network 108 or the switch fabric 110. The first pass classifier 200 is coupled via a memory controller 202 to a small internal memory 104 which in this embodiment is assumed to be a portion of the internal memory 104 shown in FIG. 1. The first pass classifier 200 is further coupled to a post processor 204. The post processor 204 is coupled via a memory controller 206 to a large internal buffer memory 104B which in this embodiment is also assumed to be a portion of the internal memory 104 shown in FIG. 1. The post processor 204 and memory controller 206 are each coupled to a second pass classifier 208. An output of the second pass classifier goes to subsequent processing circuitry which may include, e.g., scheduling circuitry, queuing circuitry, dispatch circuitry, etc.

The first pass classifier 200 of FIG. 2 may be implemented as a preclassifier which performs at least one of a reassembly operation, a parity check and a priority determination for a given packet, while the second pass classifier 208 is implemented as one or more classification engines which perform at least one of a scheduling operation, a queuing operation and a dispatch operation. It is also possible that one or both of the classifiers 200, 208 may implement statistics gathering operations for use in scheduling and other traffic management functions. These and other operations of the classifiers 200, 208 may be implemented in a conventional manner using techniques well-known in the art, and are therefore not described in detail herein.

The memories 104A and 104B are assumed in this embodiment to be different portions of the internal memory 104 of the processor, but this is by way of example and not limitation. The memory 104A is referred to as a "small" memory and the memory 104B is referred to as a "large" memory in that the latter has a storage capacity that is larger than that of the former. As will be described in detail below, the invention utilizes the small memory 104A in a manner which allows a significant reduction to be achieved in the size of the large memory 104B, thereby substantially reducing the memory requirements of the processor 102.

In accordance with the invention, the first pass classifier 200 is operative to at least partially analyze packet data received by the network processor 202 in order to determine for a given packet a portion of the packet that is required for implementation of the second pass classification in the second pass classifier 208. The first pass classifier 200 accesses substantially all of the packet data required to make this determination by utilizing the small internal memory 104A. The determined portion of the packet is then stored in the large internal buffer memory 104B. The portion of the given packet when stored in the large internal buffer memory 104B is thereby accessible to the second pass classifier 208 as it performs the second pass classification on that packet. Advantageously, the size of the portion of the given packet that needs to be stored in the large internal buffer memory 104B is reduced as a result of the above-described processing, thereby reducing the required amount of memory in the processor.

Although shown as separate memory controllers in FIG. 2, controllers 202 and 206 may be implemented as a single memory controller, as will be appreciated by those skilled in the art.

Also, as indicated previously, one or both of the memories 104A and 104B may be implemented as separate memories, rather than implemented as different parts of the internal memory 104 as shown in FIG. 2. The term "memory circuitry" as used herein is intended to include a separate memory as well as a particular portion of a larger memory, and may refer to internal memory, external memory or combinations thereof.

It is to be understood that the network processor 102 as shown in FIG. 2 is simplified for purposes of illustration, and in a given embodiment may include additional circuitry, such as the scheduling circuitry, dispatch circuitry and queuing circuitry noted above, as well as appropriate interface circuitry for interfacing with the network 108, the switch fabric 110, and other external devices, such as an associated host processor.

Figure 3:
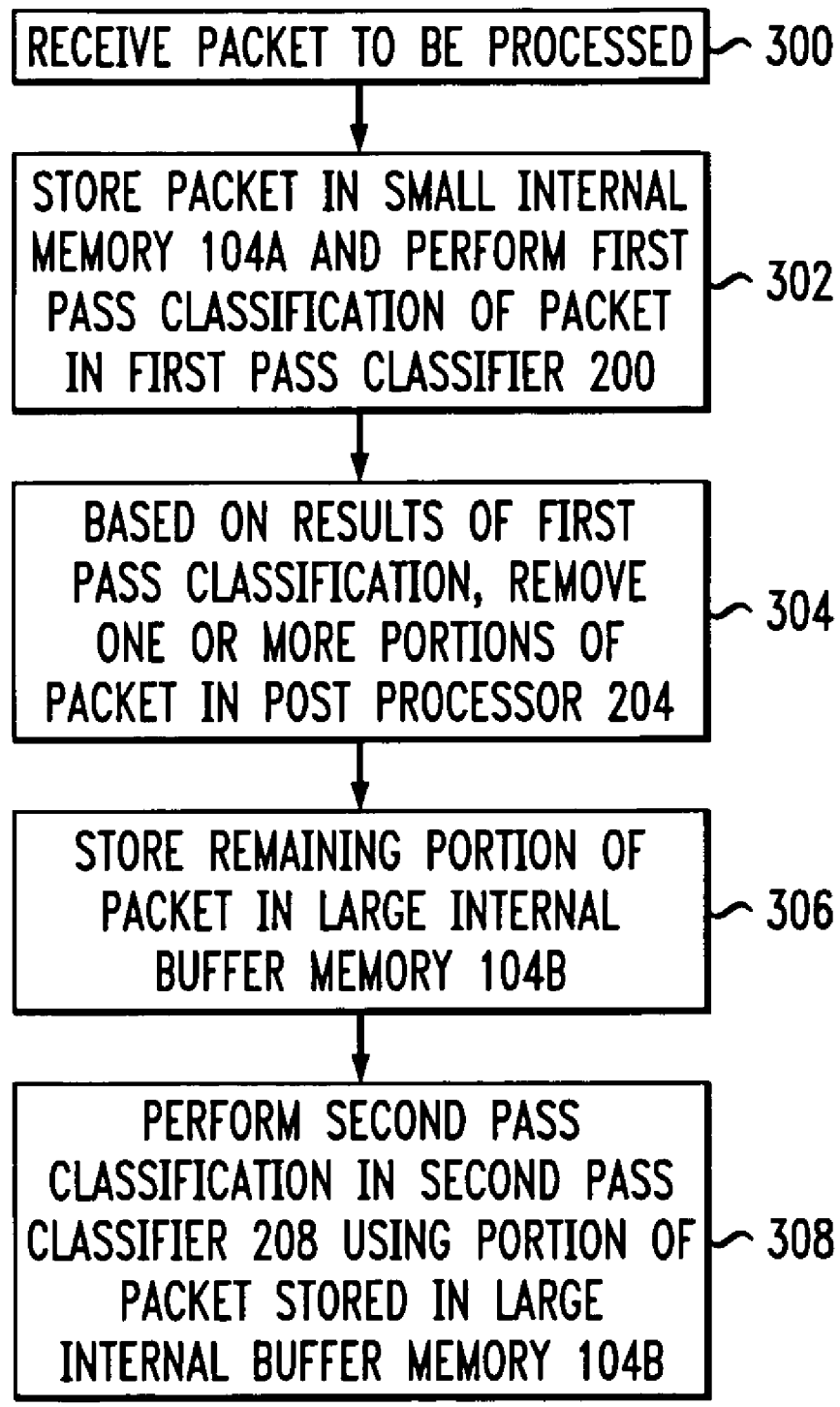
FIG. 3 is a flow diagram of a packet classification and storage process that is implementable in the FIG. 1 system by the FIG. 2 network processor in accordance with the invention.

FIG. 3 is a flow diagram that illustrates a packet classification and storage process that is implementable in the packet processing system 100 of FIG. 1 by the network processor 102.

In step 300, a packet or its corresponding packet data is received. The received data may comprise cells or other portions of the given packet that are to be reassembled to form the given packet using reassembly circuitry that may be incorporated into or otherwise associated with the first pass classifier 200. The term "packet" as used herein is therefore intended to include not only a reassembled packet but also one or more cells or other packet data which when reassembled will form a packet.

In step 302, the received packet is stored in the small internal memory 104A and the first pass classification process is performed for the packet in the first pass classifier 200.

Step 304 indicates that, based on the result of the first pass classification, one or more portions of the packet are removed by the post processor 204. The remaining portion of the packet is then stored in the large internal buffer memory 104B, as indicated in step 306.

In step 308, the second pass classification is performed in the second pass classifier 208 using the portion of the packet stored in the large internal buffer memory 104B.

It is to be appreciated that, although the FIG. 3 flow diagram illustrates the processing for a single packet, similar processing operations are applied to multiple packets in the network processor 102.

The packet as stored in the small internal memory 104A in accordance with step 302 may include substantially the entire packet, or a portion of the packet otherwise sufficient to determine an appropriate portion of the packet for storage in the large internal buffer memory 104B in accordance with steps 304 and 306.

By way of example, the portion of the given packet stored in the large internal buffer memory 104B may include a payload portion of the packet, from which at least one of a header and a trailer have been removed.

As another example, the portion of the given packet stored in the large internal buffer memory 104B may include a portion of the packet from which information added to the packet in an associated traffic management process has been removed.

As yet another example, in an embodiment in which the first pass classifier 200 is configured to perform at least a portion of a reassembly operation for the given packet, a portion of the packet required for performing the reassembly operation need not be stored in the large internal buffer memory 104B. This portion can therefore be removed by the post processor 204 before the remaining portion of the packet is stored in the large internal buffer memory 104B, in accordance with steps 304 and 306 of the FIG. 3 process.

As a further example, in an embodiment in which the first pass classifier 200 is configured to perform a parity check for the given packet, a portion of the packet required for performing the parity check need not be stored in the large internal buffer memory 104B. This portion can therefore be removed by the post processor 204 before the remaining portion of the packet is stored in the large internal buffer memory 104B, in accordance with steps 304 and 306 of the FIG. 3 process.

The portion of the given packet to be removed in step 304 based on the result of the first pass classification process may be determined in accordance with one or more instructions provided to the network processor 102 under control of a host processor or other host device operatively coupled to the network processor 102, e.g., via a peripheral component interconnect (PCI) bus. Advantageously, this allows a programmer to specify particular packet portions to be stored in the memories 104A, 104B by appropriate configuration of at least the first pass classification process implemented by first pass classifier 200.

Figure 4:
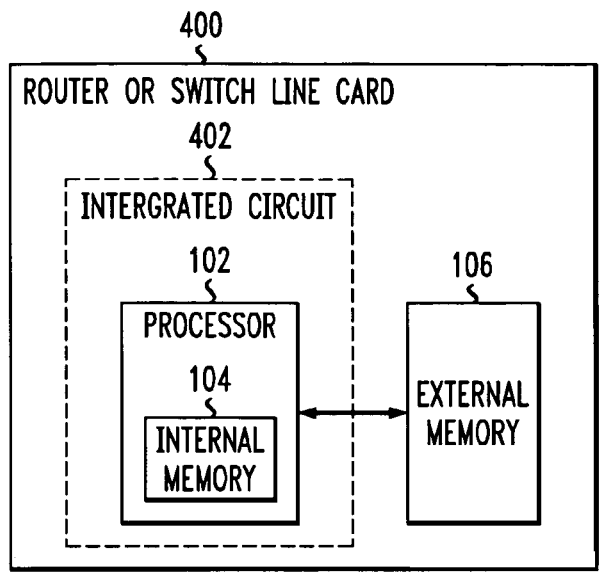
FIG. 4 illustrates one possible implementation of the FIG. 2 network processor as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The external memory 106 may serve, e.g., as an external tree memory for the network processor integrated circuit. The above-noted host processor may also be installed on the line card 400. The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card.

Figure 5:
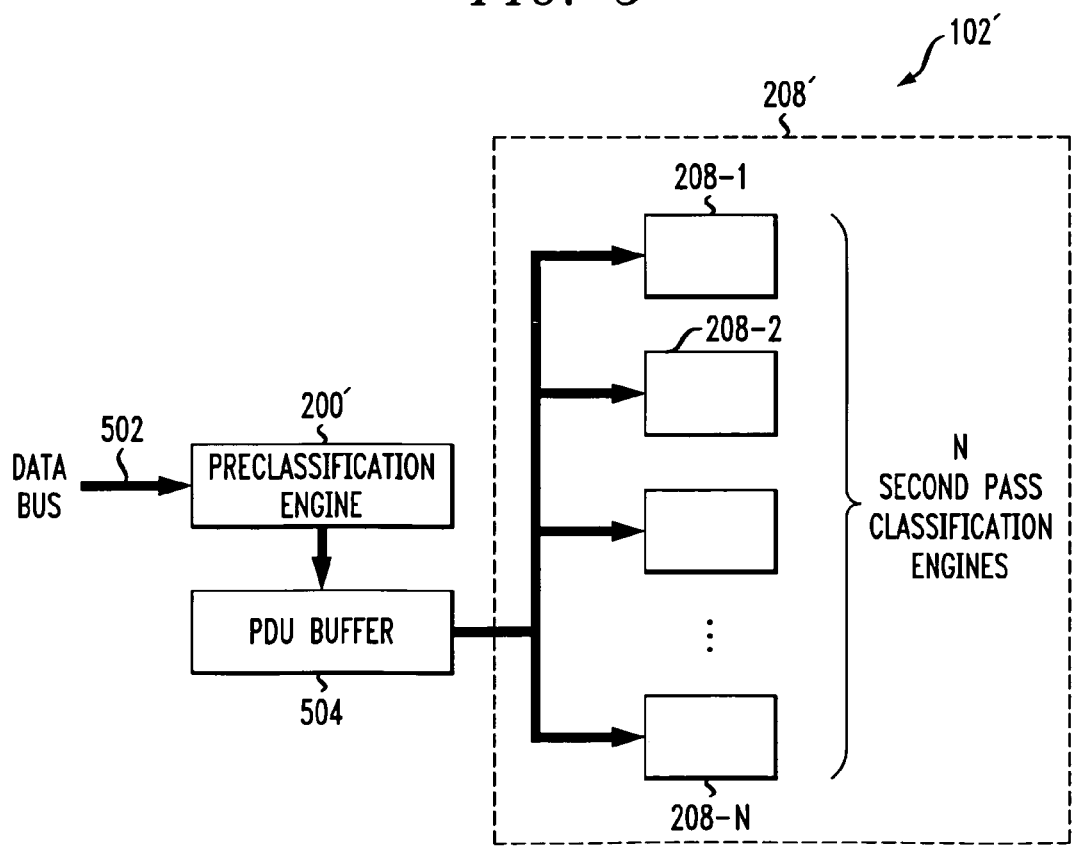
FIG. 5 shows another illustrative embodiment of the network processor of the FIG. 1 system configured in accordance with the techniques of the invention.

FIG. 5 shows another illustrative embodiment of a network processor 102' suitable for use in the FIG. 1 system. In this embodiment, the network processor 102' includes a first pass classifier in the form of a preclassification engine 200' and a second pass classifier 208' in the form of N second pass classification engines arranged in parallel as shown. The preclassification engine 200' receives packet data from the network 108 or switch fabric 110 of FIG. 1 via a data bus 502, and interfaces with memory circuitry in the form of a protocol data unit (PDU) buffer 504. A PDU in this embodiment corresponds generally to a packet. The PDU buffer 504 is also accessible to the N second pass classification engines of the second pass classifier 208'. The PDU buffer 504 corresponds generally to the large internal buffer memory 104B of the FIG. 2 embodiment. It is assumed for the FIG. 5 embodiment that the preclassification engine 200' includes or otherwise has associated therewith a memory corresponding to memory 104A of FIG. 1, although this memory is not shown in FIG. 5.

In accordance with the invention, the preclassification engine 200' can be configured to perform a first pass classification to generate information which is passed to the classification engines of the second pass classifier 208' via a tag or other specified data structure, so as to reduce the time required to perform the second pass classification.

The first pass classification can be implemented on portions of a packet, e.g., on a cell basis, where each cell comprises a portion of a packet. Such an arrangement allows packet data statistics to be collected on a cell basis rather than a complete packet basis, which may be important in certain implementations.

As indicated previously, it is also possible to prioritize the packets in accordance with a desired prioritization for scheduling of second pass classification.

The preclassification engine 200' is also preferably configured to determine portions of cells, packets or other packet data that need not be stored in internal memory, in a manner similar to that described previously in conjunction with FIGS. 2 and 3, so as to reduce the memory requirements of the PDU buffer 504.

The above-described embodiments of the invention are intended to be illustrative only. For example, although the illustrative embodiment utilizes separate first pass and second pass classifiers, other embodiments may combine the functionality of these elements into a single classification engine, set of classification engines or other type of classification circuitry. In addition, although the memories 104A, 104B are illustratively internal to the network processor in the embodiments described above, this is by way of example only. Other embodiments can use different types of internal or external memory configurations for implementing the described functionality. Furthermore, the particular portions of a given set of packets to be stored in an internal buffer memory can be varied depending upon the processing application, e.g., under software control via a host processor. These and numerous other alternative embodiments within the scope of the following claims will be apparent to those skilled in the art.

What is claimed is:

1. A processor comprising:
   first classification circuitry;
   first memory circuitry coupled to the first classification circuitry, the first memory circuitry being configurable to store at least a portion of a given packet to be processed by the first classification circuitry;
   second classification circuitry; and
   second memory circuitry coupled to the second classification circuitry, the second memory circuitry being configurable to store at least a portion of the given packet to permit processing thereof by the second classification circuitry;
   wherein the first classification circuitry is operative to perform a first pass classification on the given packet, and further wherein the portion of the given packet storable in the second memory circuitry comprises a portion of the given packet determined by the first pass classification to be required for a second pass classification performed by the second classification circuitry; and
   wherein the first classification circuitry in processing a plurality of packets comprising the given packet and an additional packet generates respective first and second first pass classification determinations that are different from one another and that result in different-sized portions of the respective packets being stored in the second memory circuitry for processing by the second classification circuitry.

2. The processor of claim 1 wherein the processor is configured to provide an interface between a network from which the packet is received and a switch fabric.

3. The processor of claim 1 wherein the portion of the given packet storable in the second memory circuitry comprises at least a payload portion of the packet from which at least one of a header and a trailer have been removed.

4. The processor of claim 1 wherein the portion of the given packet storable in the second memory circuitry comprises at least a portion of the packet from which information added to the packet in an associated traffic management process has been removed.

5. The processor of claim 1 wherein the first memory circuitry comprises a first internal memory of the processor coupled to the first classification circuitry via a first memory controller.

6. The processor of claim 1 wherein the second memory circuitry comprises an internal buffer memory of the processor coupled to the second classification circuitry via a second memory controller.

7. The processor of claim 1 wherein the first memory circuitry and the second memory circuitry comprise different portions of a single memory internal to the processor.

8. The processor of claim 1 wherein the second memory circuitry has a larger storage capacity than the first memory circuitry.

9. The processor of claim 1 wherein the first pass classification is configured to perform at least a portion of a reassembly operation for the given packet, such that a portion of the packet required for performing the reassembly operation need not be stored in the second memory circuitry.

10. The processor of claim 1 wherein the first pass classification is configured to perform a parity check for the given packet, such that a portion of the packet required for performing the parity check need not be stored in the second memory circuitry.

11. The processor of claim 1 wherein the first pass classification comprises at least one of a reassembly operation, a parity check and a priority determination.

12. The processor of claim 1 wherein the first pass classification generates information which is passed in a specified data structure to the second classification circuitry for use in the second pass classification.

13. The processor of claim 1 wherein the first pass classification is performed on a plurality of cells comprising the given packet.

14. The processor of claim 1 wherein the portion of the given packet determined by the first pass classification is determined in accordance with one or more instructions provided to the processor under control of a host device operatively coupled to the processor.

15. The processor of claim 1 wherein the processor comprises a network processor.

16. The processor of claim 1 wherein the processor is configured as an integrated circuit.

17. A method for use in a processor comprising first and second classification circuitry coupled to respective first and second memory circuitry, the method comprising the steps of:
    storing in the first memory circuitry at least a portion of a given packet to be processed by the first classification circuitry; and
    performing in the first classification circuitry a first pass classification on the given packet, wherein a portion of the given packet storable in the second memory circuitry comprises a portion of the given packet determined by the first pass classification to be required for a second pass classification to be performed by the second classification circuitry;
    wherein the first classification circuitry in processing a plurality of packets comprising the given packet and an additional packet generates respective first and second first pass classification determinations that are different from one another and that result in different-sized portions of the respective packets being stored in the second memory circuitry for processing by the second classification circuitry.

* * * * *